United States Patent [19]

Clegg

[11] Patent Number: 4,602,615
[45] Date of Patent: Jul. 29, 1986

[54] SOLAR WALL PANEL

[76] Inventor: John E. Clegg, 2320 Keystone Dr., Orlando, Fla. 32806

[21] Appl. No.: 772,531

[22] Filed: Sep. 4, 1985

[51] Int. Cl.⁴ ............................................. F24J 2/18
[52] U.S. Cl. ................................. 126/439; 126/440
[58] Field of Search .............................. 126/439, 440

[56] References Cited

U.S. PATENT DOCUMENTS

| | | | |
|---|---|---|---|
| 2,881,654 | 4/1959 | Toffolo | 88/1 |
| 2,882,784 | 4/1959 | Toffolo | 88/1 |
| 4,057,048 | 11/1977 | Maine | 126/440 |
| 4,277,148 | 7/1981 | Clegg | 350/432 |
| 4,325,612 | 4/1982 | Clegg | 350/432 |
| 4,333,713 | 6/1982 | Clegg | 350/432 |
| 4,492,438 | 1/1985 | Clegg | 350/432 |
| 4,521,085 | 6/1985 | Clegg | 350/432 |

Primary Examiner—Carroll B. Dority, Jr.

[57] ABSTRACT

A construction member comprising a curved metal frame having a conical beam concentrator, an exterior plate glass cover, and an interior plastic wall panel mounted therein and serving as the circular wall panel of a circular building. The concentrator receives an incipient beam of diffused sunlight and refracts a concentrated annular beam onto a conical mirror which reflects a convergent lateral beam inward to the center of the building. A circular conical beam concentrator located in the crawl space refracts the beam twice more and emits a concentrated beam onto a heating element through which domestic hot water circulates.

1 Claim, 5 Drawing Figures

U.S. Patent  Jul. 29, 1986  4,602,615
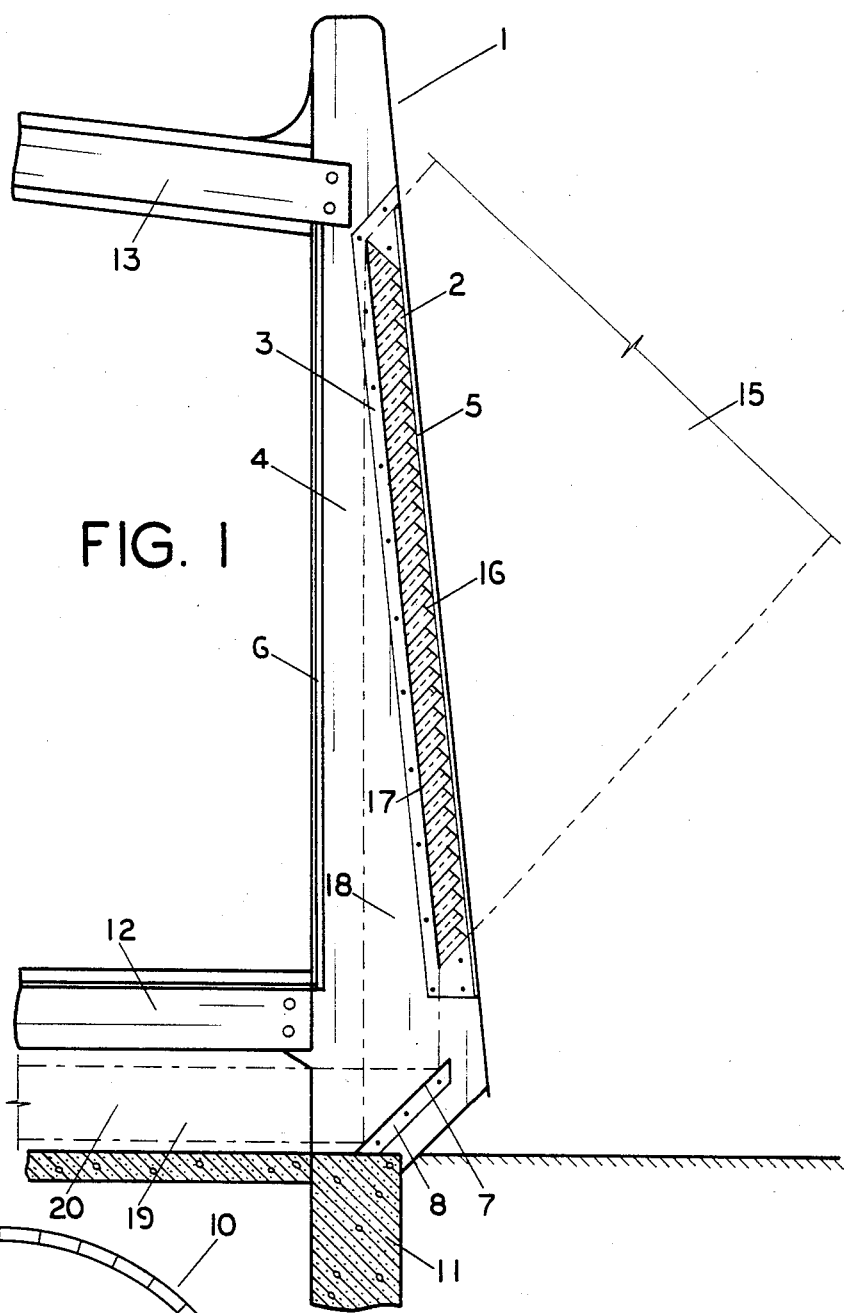
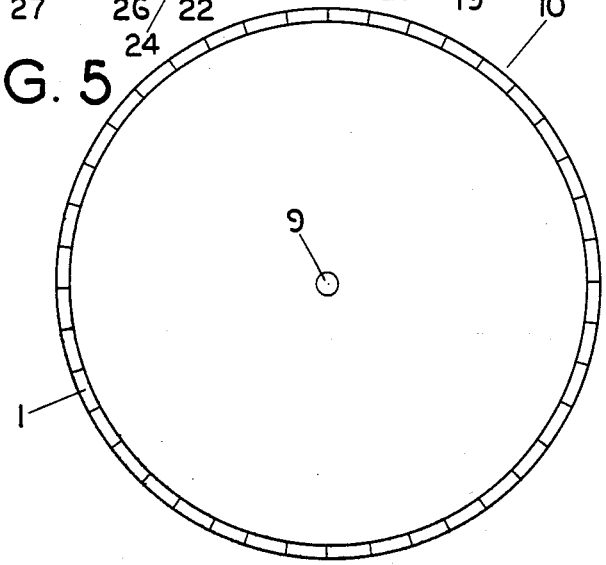

SOLAR WALL PANEL

BACKGROUND

The code designation of the optical lenses of the solar wall panel is 2RT-L-RT:C (R—refracting section of a component lens, T—transmitting section of a component lens, L—reflecting section of a mirror, and C—concentrating stage lens). 2RT refers to the circular conical beam concentrator in the center of the building, L refers to the conical mirror, RT refers to the conical beam concentrator mounted in the panel forming the exterior wall of the building, and C refers to the function of the lenses.

Prior art includes three conical beam concentrators which receive annular incipient beams of direct sunlight and emit concentrated circular whole beams (U.S. Pat. Nos. 2,881,654 and 2,882,784 by Toffolo and 4,325,612 by Clegg) and four conical beam concentrators which receive whole incipient beams of direct sunlight and emit concentrated whole beams (U.S. Pat. Nos. 4,277,148; 4,333,713; 4,492,438; and 4,521,085 by Clegg). None of these concentrators can receive convergent conical incipient beams and emit concentrated convergent lateral beams in the horizontal plane, this being the distinctive patentable feature of the disclosure.

Concurrent art includes three conical beam concentrators which receive convergent conical beams of diffused sunlight and emit circular whole beams parallel to the vertical axis; *Conical Beam Concentrator* RT:C, Ser. No. 634,155, filed 7/25/84, now U.S. Pat. No. 4,575,196, *Conical Beam Concentrator* RT:C, Ser. No. 651,015, filed 9/17/84, now U.S. Pat. No. 4,577,938, and *Conical Beam Concentrator* RT:C, Ser. No. 641,274, filed 8/16/84.

The circular conical beam concentrator mounted in the crawl space in the center of the building in the subject disclosure is identical to a concentrator in an application filed earlier; *Circular Conical Beam Concentrator* 2RT:C, Ser. No. 654,297, filed 9/25/84, now abandoned.

The solar panel wall disclosed herein is one of three inventions in which the elements of conical optics and architecture are combined to produce circular buildings which are heated by diffused solar radiation. The other two inventions are; *Conical Diffused-Sunlight Solar Panel*, Ser. No. 762,896, filed 8/6/85, with an annular roof-mounted conical lens, and *Wall-Mounted Conical Beam Concentrator*, Ser. No. 770126, filed 8/28/85, with a conical lens mounted to the lower three courses of a concrete-block wall.

The areas of the incipient beams of these units are measured in hundred of thousands of square centimeters, and the concentrated lateral beams which provide the heat to the heating elements are less than ten square centimeters in area. Beam reductions of this magnitude are necessary because the heat content of diffused radiation is low.

DRAWINGS

FIG. 1 is an elevation of the solar wall panel.

FIG. 2 is an elevation of the circular beam concentrator mounted in the crawl space in the center of the building.

FIG. 3 is an elevation of a side plate of the solar wall panel.

FIG. 4 is a elevation of the front plate and plate glass cover of a solar wall panel.

FIG. 5 is a plan view of forty solar wall panels forming the wall of a circular building, with the circular conical beam concentrator shown in the center.

DESCRIPTION

The term solar wall panel used herein refers to a system comprising a wall panel and its constituent parts including the circular conical beam concentrator mounted in the center of the building.

FIG. 1 is an elevation of the solar wall panel 1 showing the annular frusto-conical beam concentrator 2 mounted on bracket 3 inside side plate 4, exterior plate glass cover 5, interior plastic wall panel 6, concave conical mirror 7 mounted on bracket 8, and the circular conical beam concentrator 9 (FIG. 2) mounted in the center of the circular building 10 (FIG. 5). The near side plate (not shown) has been excluded from the drawing in order to expose the interior parts to view.

Panel 1 rests on foundation wall 11 and supports floor joists 12 and rafters 13 as shown.

FIG. 4 is an elevation of panel 1 showing front plate 14 and plate glass cover 5.

FIG. 5 is a plan view of circular building 10 constructed of forty panels. The diameter of the building is fifteen and a half meters (fifty-one feet). A circular building is adapted to the use of annular conical beam concentrators, and it has a cost advantage over rectangular buildings in that it encloses twenty seven percent more floor space than a rectangular building with walls of the same length.

Referring to the ray diagrams of FIGS. 1 and 2, convergent conical incipient beams 15 of diffused sunlight is received and transmitted by thirty-four inset convex conical sections 16 and refracted by concave conical section 17, forming concentrated annular beam 18.

Beam 18 is reflected by concave conical mirror 7, forming convergent lateral beam 19 which is projected parallel to the horizontal plane through crawl space 20 toward the center of the building.

Beam 19 is transmitted by cylindrical section 21 and refracted and emitted by two opposed concave conical sections 22 of outer component lens 23 of concentrator 9, forming two concentrated convergent conical beams 24.

Beams 24 are transmitted by two opposed convex conical sections 25 and refracted and emitted by two opposed concave conical sections 26 of inner component lens 27, forming concentrated convergent lateral beam 28 which strikes heating element 29.

Heating element 29 is a vertical hot water pipe which absorbs the heat of beam 28 and transfers the heat to water circulating through the pipe. Excess hot water treated during the day is stored in a large underground tank and circulated throughout the building as a source of heat during the night.

The heat content of diffuse solar radiation is low, and this means that a relatively large incipient beam must be received and reduced in size to a relatively small concentrated beam with an intensity high enough to provide sustained heat to the heating element throughout the daylight hours. The beam concentrators of the solar wall panel achieve the required reduction in size both by refraction (reduction in the vertical plane) and by convergence (reduction in the horizontal plane) as shown in the table below:

| Beam | Incident bm. area - cm² | Means of reduction | Reduced bm. area - cm² |
|---|---|---|---|
| Incipient bm. 15 | 667,000 | Refraction | 122,000 |
| Conv. lat. bm. 19 | 122,000 | Convergence | 6,380 |
| Conv. lat. bm. 19 | 6,380 | Refraction | 496 |
| Conv. conc. bms. 24 | 496 | Refraction | 9.4 |

The area of 667,000 cm² of incipient beam 15 is produced by only thirty two of the total forty panels comprising the wall of the circular building. Eight lenses must be excluded to make room for doors and windows.

The reduced beam area of 9.4 cm² is the area of concentrated lateral beam 28 at the point of contact with heating element 29, the means of reduction being both refraction and convergence, with the latter being not listed in the table but included in the total reduction in beam size:

The number of windows needed in the house is less than ordinarily required, because the interior plastic wall panels 6 are translucent and admit a soft light that would be excluded by solid walls.

I claim:

1. A solar wall-panel heating system comprising in general multiple segments of a frusto-conical beam concentrator mounted inside multiple wall panels of a circular building, and a circular conical beam concentrator mounted in the center of the building; the beam concentrators serving as means of receiving a beam of diffused solar radiation and of reducing the beam to a small concentrated convergent lateral beam projected onto a central heating element; and comprising in particular;

a solar wall panel (1) having two vertical metal side plates (4) occupying radial planes of the circular building (10), having an exterior plate glass cover (5) mounted to the outer edges of the side plates (4), having a front metal plate (14) mounted to the outer edges of the side plates (4) above and below exterior plate glass cover (5), and having an interior plastic wall panel (6) mounted to the inside edge of side plates (4), side plates (4) having an elongate bracket (3) for mounting the frusto-conical beam concentrator, side plates (4) having a bracket (8) on which is mounted a concave conical mirror;

a segment of an annular frusto-conical beam concentrator (2) mounted on elongate brackets (3) and having a series of inset convex conical sections (16) which receive and transmit a convergent conical incipient beam (15) of diffused solar radiation, and having a concave conical section (17) which refracts and emits incipient beam (15), forming concentrated annular beam (18); said concave conical mirror (7) mounted on angular brackets (8) and having a reflective surface which reflects concentrated annular beam (18), forming convergent lateral beam (19) which is projected parallel to the horizontal plane toward the center of circular building (10);

a circular conical beam concentrator (9) mounted in the center of circular building (10) and having an outer component lens (23) with a cylindrical section (21) which receives and transmits convergent lateral beam (19), and with two opposed concave conical sections (22) which refract and emit convergent lateral beam (19), forming two concentrated convergent conical beams (24); and having an inner component lens (27) with two opposed convex conical sections (25) which receive and transmit convergent conical beams (24), and with two opposed concave conical sections (26) which refract and emit convergent conical beams (24), forming concentrated convergent lateral beam (28); and a heating element (29) comprising a vertical hot water pipe mounted inside inner component lens (27) of circular conical beam concentrator (9) so as to intercept concentrated convergent lateral beam (28) and absorb the heat thereof.

* * * * *